US005869119A

United States Patent [19]

Kligerman et al.

[11] Patent Number: 5,869,119

[45] Date of Patent: Feb. 9, 1999

[54] METHOD OF REDUCING DISTRESS IN MAMMALS DUE TO INGESTION OF ACIDIC FOODS AND BEVERAGES

[75] Inventors: Alan E. Kligerman, Egg Harbor Township; Sarah Hartzell, Mays Landing, both of N.J.

[73] Assignee: Akpharma Inc., Pleasantville, N.J.

[21] Appl. No.: 913,132

[22] PCT Filed: Jul. 23, 1996

[86] PCT No.: PCT/US96/12105

§ 371 Date: Sep. 8, 1997

§ 102(e) Date: Sep. 8, 1997

[87] PCT Pub. No.: WO97/04661

PCT Pub. Date: Feb. 13, 1997

Related U.S. Application Data

[63] Continuation-in-part of Ser. No. 507,095, Jul. 26, 1995, Pat. No. 5,665,415.

[51] Int. Cl.[6] ................................ A23F 3/20; A23F 5/22; A23L 1/304

[52] U.S. Cl. ............................ 426/74; 426/590; 426/594; 426/597; 426/599; 426/616

[58] Field of Search .............................. 426/590, 74, 594, 426/597, 599, 616

[56] References Cited

U.S. PATENT DOCUMENTS 2,036,345 4/1936 Merkel .
3,061,442 10/1962 Ward .
5,202,145 4/1993 Wisler et al. .
5,665,415 9/1997 Kligerman et al. .................... 426/590

FOREIGN PATENT DOCUMENTS

A523687 5/1976 U.S.S.R. .

*Primary Examiner*—Helen Pratt
*Attorney, Agent, or Firm*—Panitch Schwarze Jacobs & Nadel, P.C.

[57] ABSTRACT

A method is provided for increasing the pH of acidic foods and beverages, to thereby reduce the tendency of such foodstuffs to cause heartburn and other esophageal and/or gastrointestinal distress to the consumer. An acidic food or beverage, such as coffee, is combined with an amount of calcium glycerophosphate (CGP) effective to raise the pH of the food or beverage, preferably by at least about 0.5 pH units, and more preferably to a pH of between about 5.4 and 7.0. Edible compositions including CGP, having a pHl of greater than about 5.4 are obtained. The CGP may also be added to acidic foods to remove the biting flavor that such foods have, and thus CGP serves as a flavor modulator, Packages comprising CGP inside a container, where the container may be easily opened to provide a single dose of CGP, are useful in the method and in forming the edible compositions.

9 Claims, 1 Drawing Sheet pH
7
6.5
6
5.5
5
4.5
0.1 0.2 0.3 0.4 0.5 0.6 0.8 0.9 1 2 2.5 5
Grams of CGP per an 8 oz. cup of coffee

METHOD OF REDUCING DISTRESS IN MAMMALS DUE TO INGESTION OF ACIDIC FOODS AND BEVERAGES

CROSS-REFERENCE TO RELATED APPLICATION

This application is a Section 371 of International Application PCT/US96/12105, filed Jul. 23,1996, and a continuation-in-part of U.S. application Ser. No. 08/507,095, now U.S. Pat. No. 5,665,415 filed Jul. 26, 1995.

FIELD OF THE INVENTION

The invention relates to foods and beverages, and particularly to methods of increasing the pH of acidic foods and beverages to ameliorate heartburn and other ill-effects attendant eating and ingesting such foodstuffs. The invention provides ingestible compositions having reduced acidity, and packages useful in preparing the compositions.

BACKGROUND OF THE INVENTION

Most people enjoy eating and drinking acidic foods and beverages (referred to generically herein as "food" or "foods"), where pizza, coffee and wine are common examples of popular acidic foods. However, for some people, the ingestion of acidic foods has undesirable consequences. For example, the acid in acidic food such as wine is perceived as a sharp taste, or bite, when that food is taken into a consumer's mouth. For some people, acidic food has too much bite, and thus is less palatable than would be preferred. Also, some people suffer from heartburn after ingesting even moderate amounts of acidic food. A problem attendant to ingesting large quantities of acidic food, including acid-based medicines, is that the consumer's stomach may reach dangerously low pH levels over an extended period of time, because of the sheer quantity of exogenous acid ingested, and this can lead to ulcers or other gastrointestinal and esophageal tract ailments.

According to one medical dictionary, heartburn is an esophageal symptom consisting of a retrosternal sensation of warmth or burning occurring in waves and tending to rise upward toward the neck. It may take the form of water brash, where water brash is heartburn including regurgitation of sour fluid or almost tasteless saliva into the mouth. See *Dorland's Illustrated Medical Dictionary*, 28th Edition, 1994 (W. B. Saunders Co.). When people develop heartburn, they may ingest antacids, that are available over-the-counter, to help neutralize the stomach acid.

For some people, heartburn is the almost inevitable consequence of ingesting certain food, and particularly acidic food. Thus, for some people, drinking coffee inevitably gives rise to heartburn. At present, these particular people must either forego drinking coffee, drink coffee substitutes, suffer from the effects of heartburn, or resort to treating the effects of heartburn by, e.g., medication. None of these options is particularly satisfactory to people who like to drink coffee and ingest other acidic food, but who are particularly susceptible to ill-effects attendant to a decrease in the pH of the stomach.

While the prior art has given much attention to the treatment of heartburn and other ill-effects caused by eating acidic foods, little attention has heretofore been given to developing methods and compositions that reduce the incidence of the problems and unwanted effects caused by eating acidic food. For example, little attention has been given to providing a milder taste for acidic foods, or to preventing the formation of heartburn and other esophageal and/or gastrointestinal distress caused by ingesting acidic foods. There exists a great but unmet need for a method to treat acidic foods so as to make them more palatable, and to reduce or eliminate their tendency to give rise to heartburn and other conditions caused by an excess of acidity in the stomach of a consumer.

SUMMARY OF THE INVENTION

The present invention provides a method of increasing the pH of acidic foods and acidic beverages. The method comprises combining calcium glycerophosphate with an acidic food or an acidic beverage. The amount of calcium glycerophosphate to be used is an amount effective to increase the pH of the acidic food or acidic beverage to a level such that, when a consumer ingests the combination of calcium glycerophosphate and acidic food or acidic beverage, the consumer will experience less heartburn and other esophageal and/or gastrointestinal distress than if the acidic food or acidic beverage had been ingested without the calcium glycerophosphate.

Another aspect of the invention is a method of reducing heartburn and other esophageal and/or gastrointestinal distress in mammals due to ingestion of acidic foods and acidic beverages. The method comprises contemporaneous ingestion of an acidic food or acidic beverage and an amount of calcium glycerophosphate effective to at least minimize the heartburn and other esophageal and/or gastrointestinal distress that would result if the acid food or acidic beverage had been ingested absent contemporaneous ingestion of the calcium glycerophosphate.

A further aspect of the invention is a composition comprising calcium glycerophosphate and an edible material. The edible material may be, for example, acidic food, acidic beverage, and at least partially dehydrated versions and components thereof, where the composition has a pH of greater than about 5.

In the above methods and compositions, the acidic beverage may be, for example, coffee, including decaffeinated coffee, beer, fruit juice, tomato juice, lemonade, soft drinks, wine and at least partially dehydrated versions thereof, which includes instant coffee, ground coffee, fruit juice concentrates, syrups for soft drinks, etc. The acidic food may be, for example, pickles, citrus-flavored water ices and sherbets, salsa, pickled herring, spaghetti, pizza, sweet and sour soup, sauerkraut, and components of acidic food such as tomato sauce which is a component of spaghetti and pizza. However, acidic foods and beverages are also intended to include other acidic ingestibles, such as acid-based medicines or oral medications or dietary supplements having acidic active ingredients, excipients, vehicles or formulation ingredients. Such medicines include, for example, analgesics or anti-inflammatories, such as aspirin and ibuprofen.

A still further aspect of the invention is a package comprising calcium glycerophosphate within a container. A preferred container has apertures, much like a salt shaker, to allow calcium glycerophosphate to be released from the container when the container is shaken and held such that the apertures are directed downward toward the food. Another preferred container is a non-resealable container which can be manually opened by the average adult human without using tools.

BRIEF DESCRIPTION OF THE DRAWINGS

The foregoing summary, as well as the following detailed description of the preferred embodiment of the invention, will be better understood when read in conjunction with the appended drawing. In the drawing.

DESCRIPTION OF THE PREFERRED EMBODIMENTS

Figure 1:
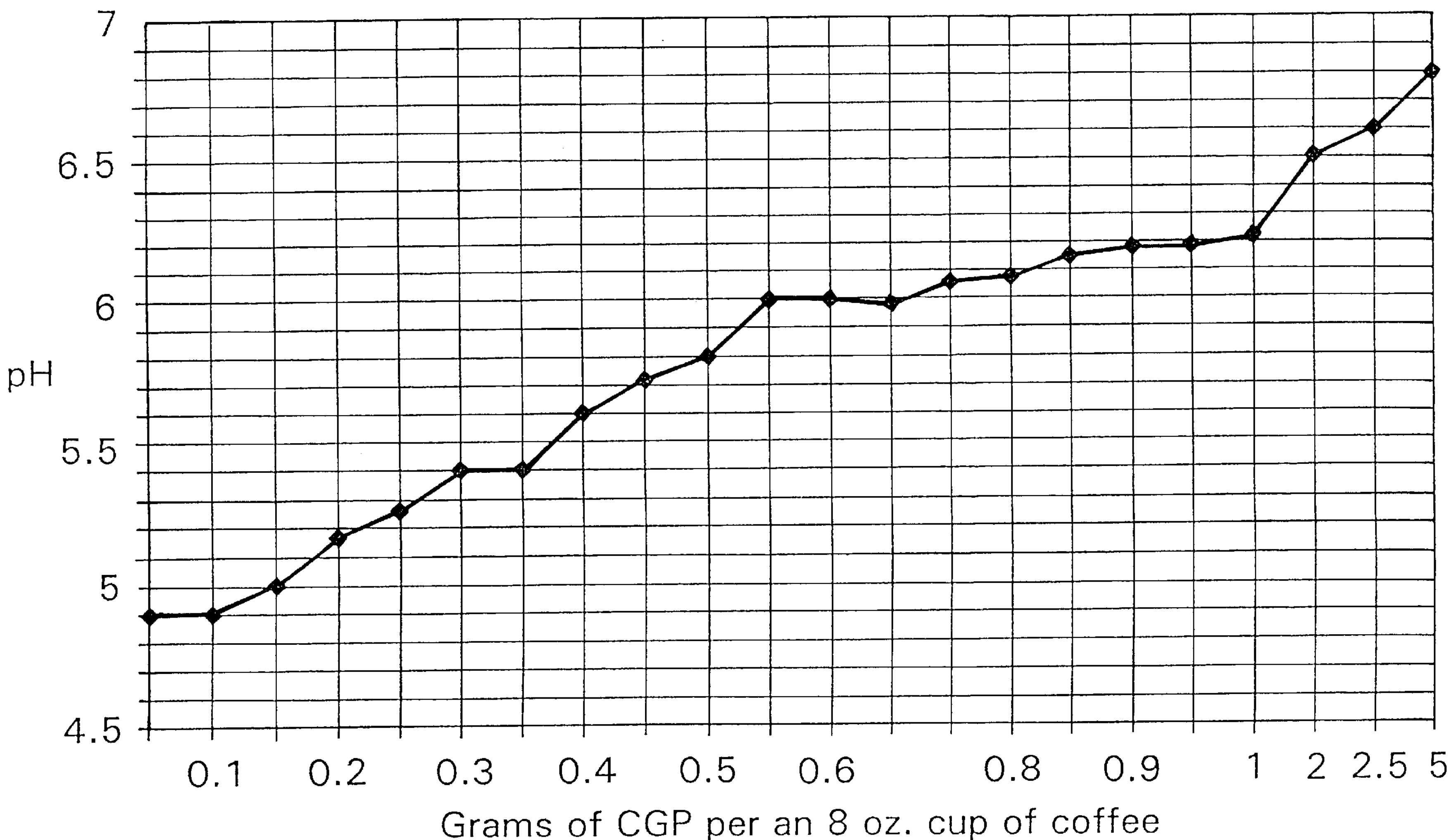
FIG. 1 is a graph of the pH of an eight ounce cup of coffee as a function of the quantity of calcium glycerophosphate added to the coffee.

As indicated above, the invention is directed to methods and compositions employing calcium glycerophosphate (CGP). Calcium glycerophosphate is also known as 1,2,3-propanetriol, mono(dihydrogen phosphate) calcium salt (1:1), calcium glycerinophosphate, calcium phosphoglycerate and Neurosin®. It has a molecular formula of $C_3H_7CaO_6P$ and a formula weight of 210.14 (anhydrous). It may exist as a hydrate, including the monohydrate and the dihydrate. Three CGP isomers exist, namely β-glycerophosphoric acid calcium acid calcium salt ($HOCH_2CH(OH)CH_2OPO_3Ca$). Any one isomer, or any combination of two or more isomers may be used as the CGP according to the invention. A commercially available form of CGP is a mixture of calcium β- and DL-α-glycerophosphates, and this is a preferred CGP according to the invention. The preferred form of CGP is food grade CGP according *Foods Chemical Codex* (FCC) III, and may be obtained from Gallard Schlesinger Company, Carl Place, N.Y. 11514, which is a distributor for the Dr. Paul Lohmann GmbH KG of Emmerthal, Germany.

CGP is odorless, almost tasteless, and forms a fine, slightly hygroscopic powder. CGP may also be formed into tablets, and may be dissolved into water. The solubility of CGP is about 1 gram in about 50 mL of water. FCC III lists CGP as a nutrient/dietary supplement, but does not indicate that CGP is either an alkali or a buffer/neutralizing agent. Thus, CGP is known in the art to be useful as a dietary supplement for calcium and phosphate, where CGP contains 19 wt % calcium.

The CGP may be used alone or in combination with other calcium salts, such as calcium carbonate, calcium acetate, calcium oxide, calcium hydroxide, calcium phosphate, calcium lactate and calcium citrate. As CGP is relatively expensive, combining CGP with a calcium salt such as listed above affords a less expensive composition that may be used to neutralize the acidity of food. However, the combination of CGP and one or more additional calcium salts may have solubility properties that are very different from that of CGP alone. One of the surprising advantages of using CGP compared to other calcium salts is that CGP readily dissolves, and stays dissolved, in acidic foods and beverages, which are properties not shown by other calcium salts and compounds. Thus, if CGP will be combined with other calcium salts or compounds, the solubility and stability of the combination in the acidic food or beverage of interest should be checked.

The invention provides a method for increasing the pH of an acidic food or acidic beverage. The purpose behind the method is twofold: to decrease the biting flavor associated with eating acidic foods, and to impart to the foods a pH that is tolerable to the esophagus and stomach of the consumer. An added advantage is that CGP provides a calcium and phosphorous supplement to the consumer.

The method comprises adding CGP, which is a food-grade basic salt, to the acidic food. Absent CGP, the food will be acidic to the point that it may have a sharp, biting flavor, and may cause esophageal and/or gastrointestinal distress, where that term as used herein includes, but is not limited to, heartburn, to the consumer. With CGP, the food will have a relatively higher, more tolerable pH. The combination of CGP and food will have little or no effect on the consistency or taste of the food, as CGP itself is essentially tasteless. However, the food will be milder, i.e., it will lose some of its bite that is due to the taste sensory organs coming into contact with acid. The inventive method thus allows consumers to eat and drink their favorite acidic foods and beverages, with a desirable dampening of the acid flavor, and with little or no concern that they will subsequently develop undesirable heartburn or other esophageal and/or gastrointestinal distress.

Preferably, sufficient CGP is added to food to raise the pH of the food by at least about 0.5 to about 1.0 pH units. The acidic foods that have the greatest tendency to provide esophageal and/or gastrointestinal distress to consumers have a pH of less than about 5, so that after combination with CGP, the food has a pH of about 5.4 to about 7.0.

The method is particularly suited to acidic foods and beverages such as coffee, beer, lemonade, soft drinks such as cola, fruit juice, tomato juice, wine, citrus-flavored water ices and sherbets, sauerkraut, salsa, pickled herring, sweet and sour soups, and foods using tomato sauce such as spaghetti and pizza, including at least partially dehydrated versions thereof. Thus, the method may be used by food manufacturers for increasing, for example, the pH of dehydrated coffee, including instant coffee and ground coffee, tomato sauce and tomato paste, and dehydrated soft drinks, such as syrups. However, due to its cost, CGP is probably not preferred for mass production of foodstuffs by manufacturers. The invention also encompasses the addition of CGP to fruit juices, including concentrates of fruit juices where the consumer needs to add water to the fruit juice concentrate prior to consumption. A preferred beverage to be treated by the invention is coffee, where that term specifically includes decaffeinated coffee. Further, the CGP may be added to acidic medicines or other acidic ingestibles. Aspirin and ibuprofen are particularly problematic in their stomach acidity and could be coated or combined with CGP as an excipient, for example.

The amount and method of addition of CGP to food may vary widely, depending on many factors including the identity of the food, the taste preferences of the consumer and the susceptibility of the consumer to esophageal and/or gastrointestinal distress due to ingesting the food. For instance, soft drinks have a pH of about 2.7 to about 3.3, while coffee has a pH of about 4.6 to about 4.9. Orange juice can vary widely in its acidity. Each consumer will need to engage in some trial and error in order to determine how much CGP should be added to a portion of food.

When the consumer is unconcerned about heartburn, and only wishes to remove some of the acid-causing bite of the food, the consumer may add CGP to taste, as is currently done by consumers using salt and pepper. If the consumer wants to relieve or mitigate the esophageal and/or gastrointestinal distress caused by ingesting the food, the consumer should start by adding a small amount of CGP to a portion of food. After some time has elapsed, the consumer may feel whether the ill-effects normally attendant consuming the acid food are decreased due to the presence of CGP. The amount of CGP added to the food may be adjusted accordingly, when the next portion of that acidic food is consumed.

A typical satisfactory dose of CGP will be illustrated in connection with coffee. Coffee typically has a pH of about 4.8, and may be obtained in approximately six to eight ounce servings from many restaurants. In order to raise the pH of coffee to between about 5.8 and about 6.2, which is a sufficiently high pH to give the coffee a pleasantly mild taste and to alleviate all or nearly all esophageal or gastrointestinal distress that may be caused by coffee consumption, a serving of coffee may be combined with about 0.3 g to about 0.6 g of CGP. This combination of coffee and CGP will provide a beverage with all the flavor and consistency of standard coffee, but with a pH within the range of about 5.4 to about 7.0, preferably about 5.8 to about 6.2. At these high pH's, coffee does not cause esophageal or gastrointestinal distress to the same extent that it does when the coffee pH is only 4.8. Thus, when the acidic beverage is coffee, about 0.2 wt percent CGP may be added to the coffee according to the invention.

FIG. 1 illustrates the effect on pH of adding CGP to an eight ounce serving of coffee, having an initial pH of 4.93. As shown in FIG. 1, adding about 0.5 g of CGP to eight ounces of coffee imparts a pH of about 5.8 to the coffee.

In one aspect of the method, the acidic food and the CGP are combined in vitro, that is, they are combined outside the consumer's body prior to ingestion of either the food or the CGP. For example, adding CGP to coffee in a coffee cup is in vitro combination according to the invention. When CGP and food are to be combined in vitro, the CGP may be in the form of powder, one or more tablets, or as an aqueous solution. Preferably, the CGP is in the form of powder, because in this form the CGP is easily supplied to the consumer, and may be easily mixed with the acidic food.

In another aspect of the method, the CGP and the acidic food are combined in vivo, that is, they are combined within the consumer's body. For example, the consumer may ingest some acidic food and then, before anticipated esophageal or gastrointestinal distress begins, may also ingest some CGP. As an illustration, the consumer may swallow a tablet or pill of CGP while at the same time swallowing a sip of wine. In this way, the burning stomach that may accompany drinking a glass or two of wine will be eliminated or at least much reduced. The acidic food and the CGP are thus combined within the stomach of the consumer, i.e., in vivo. Alternatively, and more is preferably, the consumer may ingest some CGP and then ingest the acidic food.

When CGP and acidic food are to be combined in vivo, the CGP is preferably in the form of one or more small tablets, which may either be swallowed whole or chewed and swallowed, by the consumer. An advantage of in vivo combination of CGP and acidic food or beverage is that the heartburn causing tendency of the acidic food or beverage is reduced, but with absolutely no change in the taste or bite of the food or beverage.

Thus, according to a preferred method of the invention, CGP is combined with a food or beverage at a time contemporaneous with a consumer ingesting the food or beverage. As used herein, the term "contemporaneous" includes times within about 1 hour before or after the food is ingested, preferably about 15 minutes before or after the food is ingested.

According to the inventive method, a composition of CGP and food is formed. In the compositions of the invention, the food to which CGP is added is preferably an acidic food. That is, the pH of the food is preferably less than 7.0, more preferably less than about 6.0, and even more preferably less than about 5.0. One of ordinary skill in the art is knowledgeable about measuring the pH of foods, and so details regarding pH measurement will not be provided herein.

Exemplary beverages, which are included within the term food as used herein, and which are commonly acidic include beer, coffee including decaffeinated coffee, soft drinks including cola, fruit juice, tomato juice, lemonade and wine. Coffee is a preferred beverage according to the invention, where the term coffee includes decaffeinated coffee. Exemplary foods include tomato sauce and foods containing tomato sauce such as spaghetti and pizza, as well as pickles, citrus-flavored water ices and sherbets, salsa, pickled herring, sweet and sour soup, sauerkraut and the like. Other acidic ingestibles included within the term food include aspirin and other acid-based analgesics or anti-inflammatories, for example.

Suitable foods and beverages according to the invention may be completely or partially dehydrated, i.e., may be at least partially dehydrated, and may be components of foods or beverages, i.e., edible material that is a necessary component of the food or beverage. Thus, the inventive compositions include dehydrated coffee, in the form of instant coffee or ground coffee. Also, fruit juice concentrates, which may be found on the shelves or in the freezer section of many grocery stores, and are sold to the public with the intent that the public will combine water with the concentrate before consumption, are included within the meaning of at least partially dehydrated food according to the invention. Tomato paste is an exemplary partially dehydrated form of tomato sauce, where tomato sauce and tomato paste are exemplary components of foods because they are used in the preparation of, e.g., spaghetti and pizza. Syrups are an exemplary form of at least partially dehydrated soft drinks.

The invention thus specifically includes, as another embodiment, a method wherein a food manufacturer or processor adds CGP to a food, beverage, or precursor thereof, prior to the food, beverage or precursor thereof being offered for sale to a consumer or a restaurant, to provide a food, beverage or precursor thereof having a decreased acidity. The term "precursor" to a food or beverage includes at least partially dehydrated versions of foods or beverages, and components that are incorporated into foods or beverages.

As the purpose of adding CGP to food is to raise the pH of the food to a more tolerable level, the combination of CGP and food preferably has a pH of greater than about 5.4, and more preferably has a pH of about 5.4 to about 7.0. For example, when CGP is added to coffee, the combination of CGP and coffee preferably has a pH of about 5.8 to about 6.2.

Exactly how much CGP to add to the food will depend on many factors, including the size of the food portion and the particular consumer's taste preferences and tolerance to acidic food. Some trial and error on the part of each consumer will be necessary, in order to arrive at preferred dosages to be added to various foods. Consumers already do this, in regard to adding sugar and salt, etc., to their foods, even before tasting the foods, because consumers quickly become adept at estimating how much additional sugar, etc., is desirably added to a given food.

For example, coffee typically has a pH of about 4.8, and at this pH will give some people heartburn after consumption. However, by adding about 0.05 g to about 3.0 g, and preferably about 0.3 g to about 0.6 g of CGP to a typical 6–8 ounce portion of coffee, the pH of the combination becomes about 5.8 to about 6.2. When coffee is at this higher pH, it is less acidic and causes less esophageal or gastrointestinal distress to those who are prone to heartburn from standard, including decaffeinated, coffee.

When the food is a liquid, the composition may be formed by combining powdered CGP with the liquid, and stirring or otherwise blending the components together to form a homogeneous mixture. For example, CGP readily dissolves in coffee or wine simply by stirring the mixture for a minute or so, and often complete dissolution can be achieved within only a few seconds of stirring, particularly with coffee. Even when CGP is in tablet form, it will dissolve in coffee after only a few minutes or less of gentle stirring. When the food is a solid, then the CGP may be sprinkled on top of the food.

One aspect of the invention is a package comprising CGP within a container, where the package may be supplied to people who wish to incorporate CGP into their food. According to a preferred embodiment, the container has the appearance of a salt shaker or a sugar dispenser, commonly seen on restaurant tables. Thus, the container has at least one aperture, through which CGP will flow when the container is turned so that the aperture points downward toward the food. Such dispensers may be disposable, such as the paper linerboard or plastic salt and pepper shakers available for picnic or other occasional use.

In another preferred embodiment of the package containing CGP according to the invention, the package contains approximately a single dose of CGP. The container is sealed, i.e., it does not contain any aperture, but can be manually opened by the average adult human, without resort to tools. The container is not readily resealable, i.e., once the container is opened and CGP taken therefrom, it is intended that the container and any CGP remaining in the container be discarded. The package of the invention may, for example, be placed on tables in restaurants and the like, in much the same way as packets of sugar, salt, pepper, jelly, etc., are supplied to patrons of such eating establishments.

After the desired amount of CGP has been taken from the non-resealable container and combined with food, the container and any CGP remaining therein should be discarded. The container is preferably not resealable, because to have the CGP in a resealable container may encourage people to save the residual CGP, and this residual CGP may inadvertently become contaminated and therefore unsuitable for combination with food. Having the CGP in a non-resealable container encourages people to use an unopened container of CGP each time they desire to add CGP to food, and in this way the manufacturer of the article, and the public, is assured that the manufacturer can exert control over the quality of the contents within the container.

As the package with the non-resealable container is intended for a single use, it preferably contains a single does of CGP. For most people, a single dose of CGP will be about 0.05 g to about 3 g of CGP, and thus the article preferably contains an amount of CGP within this range. A more preferred article will contain about 0.3 to about 0.6 g of CGP, and therefore contain an amount of CGP which is particularly suited to adding to a typically sized cup of coffee, that is, about 6–8 ounces of coffee.

It is intended that the patron of a restaurant that provides the package of the invention be able to use his or her hands to easily open the non-resealable container, without resort to tools such as can openers, knives or scissors. A particularly preferred non-resealable container for this purpose is a packet constructed of a material such as paper, foil, plastic film and the like, including composites thereof. The restaurant patron may easily tear open a packet made, for example, of paper, in the same way as the packets of sugar that are now found on restaurant tables, may be opened. Alternatively, the packet may be in the form of a little plastic cup having a peelable top, much like cream/milk or substitutes therefor and jelly are made available in some restaurants for addition to a cup of coffee and toast, respectively.

The CGP of the package may be in one or more of several possible forms, including powder, tablet and aqueous solution. When CGP is to be dispensed from a container with one or more apertures, the CGP is preferably in a powder form, or in the form of very small tablets. Powdered CGP within paper packets, optionally in combination with an edible, food-grade anti-caking agent, in analogy to the packets of sugar which are commonplace in restaurants, are a preferred package comprising a non-resealable container according to the invention. However, instead of being powder, the CGP could be in the form of one or more tablets, that may also be placed within a paper packet. Tablets of CGP are particularly well suited to the in vivo combination of CGP with acidic foods and beverages. If aqueous solutions of CGP are to be used in the invention, then the aqueous solutions may have CGP concentrations of about 0.1 g to about 1.0 g CGP/5 mL of water, preferably about 0.2 g to about 0.6 g CGP/5 mL of water.

Neutralization of the acidity of foodstuffs according to the invention may also provide improvement in taste of the foodstuffs, although CGP itself is essentially tasteless. The "taste" of acid foods and beverages is, in part, due to the interaction of the acid with taste sensory organs, where this interaction is perceived as a sharp bite. For some people, the bite of certain acidic foods and beverages is too strong, and a milder form of the food is preferable and is more palatable. Thus, when CGP is combined in vitro with foods or beverages, the combination may be more palatable due to the neutralization of the somewhat distasteful acidic components of the food or beverage. Thus, even though a consumer may not be particularly concerned about heartburn etc. that comes from ingesting certain acidic foods, that consumer may combine CGP with acidic foods to make food more palatable by reducing or eliminating the bite of the food or beverage.

When CGP is added to foods to diminish the sharp bite thereof, CGP is preferably added at about 0.05 g to about 3.0 g of CGP to a portion of food. The exact amount to be added to a portion of food will depend on many factors, including the size of the food portion, the identity of the food, and the consumer's personal degree of dislike of the food's acidic taste. As a typical example, a six ounce to eight ounce serving of coffee may have its flavor modified by adding thereto about 0.3 to about 0.6 g of CGP. However, an individual consumer may choose to add more or less CGP to the coffee, to meet his or her individual taste preference. Also, CGP may be sprinkled onto foods containing tomato sauce, e.g., spaghetti or pizza, to reduce the acidic bite of these foods.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of reducing distress in mammals due to ingestion of acidic foods and acidic beverages comprising contemporaneous ingestion of an acidic food or acidic beverage and an amount of calcium glycerophosphate effective to at least minimize the distress that would result if the acid food or acidic beverage had been ingested absent contemporaneous ingestion of calcium glycerophosphate.

2. The method of claim 1 wherein the acidic food and acidic beverage is selected from the group consisting of coffee, beer, fruit juice, tomato juice, lemonade, soft drinks, wine and at least partially dehydrated versions thereof, pickles, citrus-flavored water ices and sherbets, salsa, pickled herring, sweet and sour soup, sauerkraut, foods containing tomato sauce, aspirin and other acid-based analgesics and anti-inflammatories.

3. The method of claim 1 wherein the amount of calcium glycerophosphate is sufficient to raise the pH of a portion of acidic food or acidic beverage by at least about 0.5 pH units.

4. The method of claim 1 wherein the amount of calcium glycerophosphate is sufficient to raise the pH of a portion of acidic food or acidic beverage to about 5.4 to about 7.0.

5. The method of claim 1 wherein about 0.05 g to about 3 g of calcium glycerophosphate and about six to about eight ounces of acidic food or acidic beverage are ingested.

6. The method of claim 1 wherein the contemporaneous ingestion is such that ingestion of the acidic food or acidic beverage occurs within about 1 hour of the ingestion of the calcium glycerophosphate.

7. The method of claim 1 wherein the acidic food or acidic beverage and calcium glycerophosphate are combined in vitro and the calcium glycerophosphate is in the form of a powder, tablet or aqueous solution.

8. The method of claim 1 wherein the acidic food and acidic beverage and calcium glycerophosphate are combined in vivo and the calcium glycerophosphate is in the form of a tablet or an aqueous solution.

9. The method of claim 8 wherein the acidic beverage is wine.

* * * * *